Dec. 7, 1954    J. D. ELLIS    2,696,395
FLARED END TUBE FITTING
Filed March 23, 1949

INVENTOR.
John Dean Ellis
BY
Parker & Burton
ATTORNEYS

United States Patent Office 2,696,395
Patented Dec. 7, 1954

2,696,395

FLARED END TUBE FITTING

John Dean Ellis, Troy, Ohio

Application March 23, 1949, Serial No. 82,987

1 Claim. (Cl. 285—120)

This invention relates to an improved tubular fluid connection which will maintain a fluid tight seal at the joint between connected tubular parts and particularly to an improved gas tight connection for a flared end tube.

An object is to provide an improved connection between tubular elements of a fluid flow line which connection is fluid tight. The connection includes a fitting designed to cooperate with a flared end tube and is so constructed that a tight joint will be formed if the connection is used in a gas line such as an oxygen line in aircraft.

A further object is to provide an improved connection of simple construction wherein the flared end of a tube cooperates with the beveled end of a fitting and a compressible resilient gasket is held under compression between the opposed beveled faces of these connected tubular parts forming a fluid tight seal therebetween. The construction is such that the gasket is not subjected to twisting effort which might injure the same during the securement of the fitting to the tube.

A further object is to provide an improved connection so arranged and constructed that the gasket which is interposed between the opposed beveled face of the connected tubular parts is protected against having any particles which are broken therefrom being discharged into the fluid line.

A further object is to provide a connection which in large part employs conventional tubular fittings.

A further object consists in providing a connection between a tube having a flared end and a tubular fitting provided with an opposed complementary beveled face wherein a compressible, resilient gasket circular in cross section is interposed between the flared end of the tube and the beveled end of the fitting and means is provided to draw said opposed angular faces toward each other without relative rotation which rotation would exert an undesirable twisting torque upon the gasket, and wherein the fitting has an axial neck encircled by the gasket which neck projects into the tube and normally seals the gasket space between the tube and the fitting from the tubular interior.

Other objects, advantages and meritorious features of this invention will more fully appear from the following description, appended claim and accompanying drawing wherein:

This fitting is particularly adapted to be used with hydraulic or pneumatic fluid lines which may be under substantial high pressure. Suitable examples are the connections in fluid lines on aircraft, such as oxygen lines or high pressure hydraulic lines. It is necessary that such connections be fluid tight and that they be simple and suitable for use with conventional flared end tubes.

Figure 1:
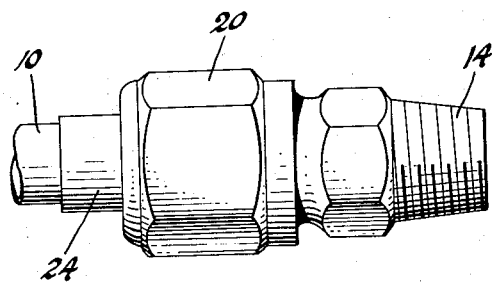
Fig. 1 is a side elevation of the improved tubular connection.
Figure 2:
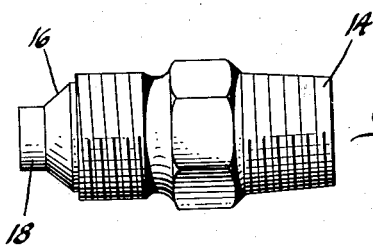
Fig. 2 is a side elevation of the tubular fitting.
Figure 3:
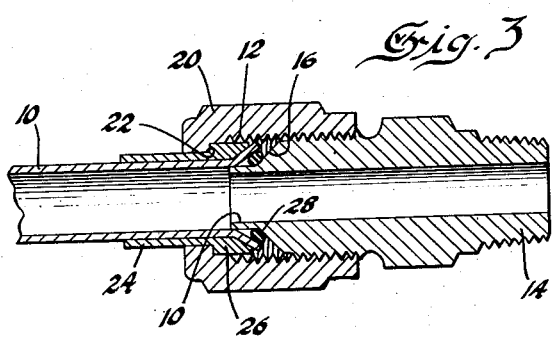
Fig. 3 is a longitudinal cross sectional view taken on the line 3—3 of Fig. 1.

In the drawing, the tube 10 is shown as having a flared end 12. Tubular fitting 14 is shown as provided with a beveled face 16, which face is beveled on an angle complementary to the flared end of the tube. This fitting is provided with an axial extension or neck portion 18 which neck is illustrated as of a diameter to be received within an end of the tube as shown in Fig. 3.

The fitting is externally threaded at opposite ends as illustrated. Coupling nut 20 is threaded upon one end of the fitting. This coupling nut encircles the tube and is provided with an internal shoulder 22. A coupling sleeve 24 encircles the tube. This sleeve is provided with an end 26 which end is of increased radial dimension and is received within the coupling nut and seats against the shoulder 22 of the nut as shown in Fig. 3. The enlarged end 26 of the tubular sleeve has a beveled face which contacts the flared end of the tube and which tends to urge the flared end inwardly as well as forwardly toward the beveled end of the coupling when the coupling nut is threaded down upon the coupling.

Figure 4:
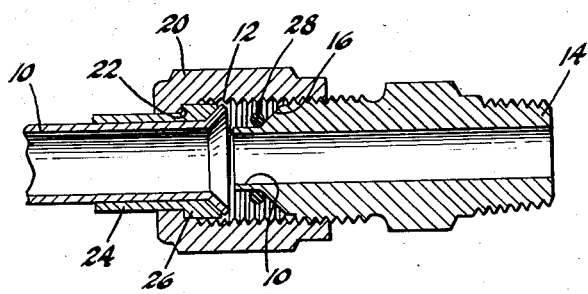
Fig. 4 is a longitudinal sectional view taken on the same line as Fig. 3 showing the component parts of the connection partially separated.

A suitable gasket 28 of rubber, neoprene or other suitable compressible resilient gasket forming material encircles the neck 18 of the fitting. This gasket is normally circular in cross section as shown in Fig. 4. This gasket is compressed between the beveled face 16 of the fitting and the flared end 12 of the tube as shown in Fig. 3. When so compressed, it is flattened and forms a fluid tight seal between these opposite angular faces of the fitting and the tube.

It is apparent that when the coupling nut 20 is threaded down upon the fitting 14 that the nut urges the beveled face of the enlarged end 26 of the tubular sleeve 24 against the flared end 16 of the tube and draws such flared end of the tube toward the beveled end 16 of the fitting and compresses the gasket 28 between said beveled face. The gasket is compressed between the beveled face of the fitting and the flared end of the tube without the exertion of any twisting torque thereupon which twisting, if it occurred, might well result in breakage or rupture of the gasket.

The gasket 28 is normally fitted in encircling relationship about the neck 18 of the fitting but as the resilient gasket is compressed between the flared end of the tube and the beveled end of the fitting, the gasket is flattened and would tend to ride or roll up on the beveled face end of the tube being urged inwardly by the sleeve as well as axially whereby the gasket establishes a sealing contact with the flared end of the tube and the beveled face of the fitting throughout an angular plane of substantial width and forms a fluid tight seal.

The neck portion 18 of the fitting normally closes the gasket gap between the end of the tube and the end of the fitting and prevents any particles of gasket material, which might be worn or fractured therefrom, from falling into the tubular interior. The joint has been shown to be fluid tight under high pressure and to be particularly effective.

What I claim is:

A tubular fluid connection comprising, in combination, a tube having a wall of substantially uniform thickness throughout its length outwardly flared at one end providing continuous, internal and external, coniform end faces, a tubular fitting having a shoulder beveled to substantially the same angle as the flared end of the tube and providing a continuous, external, coniform end face opposed to said internal coniform face, said shoulder terminating in an axial tubular extension receivable within the flared end of the tube, a coupling means slidably encircling the tube and threadedly engaging the fitting, said coupling means having a coniform face engaging the outer face of the flared end of the tube to exert axial pressure thereon and move the flared end of the tube axially toward the beveled face of the fitting when the coupling means is threaded on said fitting, and a compressible O-ring gasket encircling said axial extension and interposed between the continuous, coniform end face of the fitting and the internal coniform end face of the tube, said O-ring prior to compression between the coniform faces being seated at the juncture of said extension and the coniform face of said fitting whereby on compression the ring is free to roll outwardly along said coniform faces the cross-sectional diameter of said gasket being substantially less than the length of either of said end faces, said length being measured along the generatrix of the faces, whereby on displacement and deformation of said gasket under compression between said end faces the gasket flattens outwardly to engage on its opposite sides a substantial portion of the surfaces of said faces, said extension being so dimensioned and located in relation to the tube as to preclude contact which limits relative axial movement between the two before said gasket has been flattened substantially.

References Cited in the file of this patent

UNITED STATES PATENTS

| Number | Name | Date |
|---|---|---|
| 1,800,753 | Replogle | Apr. 14, 1931 |
| 1,985,899 | Jahn | Jan. 1, 1935 |
| 2,290,890 | Parker | July 28, 1942 |
| 2,362,686 | DeLano | Nov. 14, 1944 |
| 2,381,829 | Livers | Aug. 7, 1945 |
| 2,398,555 | Parker | Apr. 16, 1946 |

FOREIGN PATENTS

| Number | Country | Date |
|---|---|---|
| 889,819 | France | Oct. 18, 1943 |